United States Patent [19]

Emlemdi et al.

[11] Patent Number: 5,504,045

[45] Date of Patent: Apr. 2, 1996

[54] PAINT COMPOSITION

[75] Inventors: Hasan B. Emlemdi, Pittsburgh; Robert M. Koceski, Cannonsburg; Harold C. Kersteen, Wexford; Robert A. Prunchak, Beaver Falls; Matthew Sgriccia, Cranberry Township, all of Pa.

[73] Assignee: The O. Hommel Company, Carnegie, Pa.

[21] Appl. No.: 323,158

[22] Filed: Oct. 14, 1994

Related U.S. Application Data

[63] Continuation-in-part of Ser. No. 909,408, Jul. 7, 1992, abandoned, Ser. No. 909,912, Jul. 7, 1992, abandoned, Ser. No. 909,945, Jul. 7, 1992, abandoned, and Ser. No. 910,607, Jul. 7, 1992, abandoned.

[51] Int. Cl.$^6$ .............................. C03C 8/22; C03C 8/04; C03C 8/06; C03C 8/16

[52] U.S. Cl. ................... 501/16; 501/17; 501/18; 501/19; 501/20; 501/21; 501/24; 501/25; 501/26

[58] Field of Search ................... 501/26, 25, 24, 501/21, 20, 19, 18, 17, 16

[56] References Cited

U.S. PATENT DOCUMENTS

| | | | |
|---|---|---|---|
| 2,757,105 | 7/1956 | Terry | 501/16 |
| 5,342,810 | 8/1994 | Merigaud et al. | 501/26 |

*Primary Examiner*—C. Melissa Bonner
*Attorney, Agent, or Firm*—Watov & Kipnes

[57] ABSTRACT

A paint composition containing as a major portion a flux composition including a first flux containing silica, alkali oxide, zinc oxide and boron oxide but containing no lead or lithium and optionally a second flux, and minor portions of pigment and a liquid medium, particularly suited for automobile windshields.

16 Claims, No Drawings

PAINT COMPOSITION

RELATED APPLICATION

This is a Continuation-In-Part application of applications U.S. Ser. No. 07/909,408, U.S. Ser. No. 07/909, 912 U.S. Ser. No. 07/909,945 and U.S. Ser. No. 07/910,607, each filed on Jul. 7, 1992, all are now abandoned.

TECHNICAL FIELD

The present invention is directed to a paint composition, especially adapted for treating automotive windshields. The paint composition includes a major portion of a flux composition comprised of a first flux containing $SiO_2$, alkali oxide, boron oxide and zinc oxide in particular amounts and ratios to provide a coating having excellent scratch resistance and other desirable properties.

BACKGROUND OF THE INVENTION

Paint compositions especially adapted for the coating of automotive glass require a number of specific properties for commercial acceptance. The paint compositions must possess the required color and opacity. Furthermore, the coating must be scratch resistant. It is also of benefit if the paint composition does not stick to the molds which can be used to form the windshield glass. The paint composition should also be readily usable in a variety of printing mediums including UV-curable, water-miscible, thermoplastic and conventional screen printing mediums.

It is known in the art to employ a flux composition containing major amounts of zinc oxide, boron oxide, silica and alkali oxides for the decorative coating of light bulbs. Such compositions are required to withstand resistance to the heat produced from the light source. There is, however, no requirement that such coatings be scratch resistant.

Traditional windshield coatings utilize lead oxide as a major flux. The presence of lead oxide, from an engineering standpoint, is advantageous. It provides for a smooth surface, excellent gloss, and low melting temperatures. Lead oxide is a powerful flux and therefore minimizes the need for alternative fluxes such as alkali oxides. This is an advantage because alkali oxides as known by those skilled in the art, always raise the coefficient of thermal expansion (C.T.E.) of the glass. If the C.T.E. of the coating surpasses that of the substrate, tensile stresses are built up in the coating during the cooling stage of the firing process. Since glass is very weak in tension, this could lead to fracture or "crazing" of the windshield.

Lead oxide containing glasses tend to have low viscosities and low surface tensions. Lead oxide containing glasses usually have wide firing ranges, thus reducing the propensity for over firing or under firing. These properties of the traditional lead oxide containing systems facilitate the healing of any defects, thus providing a superior surface finish.

Despite the advantages obtained utilizing a flux containing lead oxide, there are well documented health and environmental hazards. For these reasons, it was deemed necessary to develop a lead-free flux system that could provide the essential properties originally obtained through the use of lead. These properties are:

1) Completely fire at low temperatures (~1060° F. for 7 minutes).

2) Have a firing "window" of at least 100° F.

3) Have a Coefficient of Thermal Expansion (C.T.E.) of lower than $92 \times 10^{-7}$.

4) Have adequate chemical durability to withstand industry wide tests that simulate reasonable exposure to the environment.

5) Have very good scratch resistance in order to withstand the normal handling encountered during the storage and installation of the windshields within the cars.

6) Allow the option of overprinting with conductive silver pastes for antennas or defroster grids.

It would be a significant advance in the art of providing automobile windshields with protective coatings if a lead-free coating could be made having the above properties.

SUMMARY OF THE INVENTION

The present invention is generally directed to a paint composition, especially adapted for the treatment of automotive windshields and other glass substrates.

In particular, the present invention is directed to a paint composition comprising:

a) as a major portion of the paint composition, a flux composition comprising from about 50 to 100% by weight of a first flux based on the total weight of the flux composition, said first flux containing no lead or lithium and from about 5 to 15 mol % of $SiO_2$, from about 8 to 18 mol % of alkali oxide, and an amount of zinc oxide and boron oxide such that the ratio of the mol % ZnO/mol % $B_2O_3$ is from about 0.8 to 1.3, the ratio of the mol % of $B_2O_3$/mol % $SiO_2$ is from about 2.5 to 5.4 and the ratio of the mol % of alkali oxide/mol % of $SiO_2$ is from about 0.8 to 1.7, and second flux in an amount from about 0 to 50% by weight.

b) a minor portion of at least one pigment; and c) a minor portion of a compatible liquid medium.

In a preferred form of the invention the second flux is present in an amount of from 20 to 50% by weight based on the total weight of the flux composition.

DETAILED DESCRIPTION OF THE INVENTION

The paint composition of the present invention employs a flux composition, pigment and liquid medium suitable for forming a coatable composition for application to windshield glass and the like.

The flux composition of the present invention preferably comprises from about 60 to 80% by weight based on the total weight of the paint composition. The liquid medium is preferably present in an amount of from about 20 to 30% by weight based on the total weight of the paint composition.

The flux composition includes one or more fluxes with the primary flux containing silica, alkali oxide, zinc oxide and boron oxide. The primary flux contains no lead or lithium compounds. The amount of silica present in the primary flux is from about 5 to 15 mol % of the flux composition, preferable from about 9 to 11 mol %.

The alkali oxides for use in the primary flux include sodium oxide, potassium oxide or a mixture of the two. The alkali oxide is present in an amount of from about 8 to 18 mol % of the flux composition, preferably from about 10 to 13 mol %. In a preferred form of the invention the alkali oxide component of the primary flux is composed of a mixture of sodium oxide and potassium oxide. The ratio of the mol % of sodium oxide to potassium oxide is in the range of from about 3.5 to 4.5.

Zinc oxide and boron oxide constitute major components of the primary flux. The ratio of the tool % of zinc oxide/tool % of boron oxide is from about 0.8 to 1.3, preferably from about 0.9 to 1.1. The ratio of the mol % of boron oxide/mol % of silica is from about 2.5 to 5.4, preferably from about 3.0 to 3.8. The ratio of the mol % of the alkali oxide/mol % of silica is from about 0.8 to 1.7, preferably from about 0.9 to 1.2.

The primary flux may optionally contain additives, principally in the form of metal oxides. The following additives and their maximum tool % based on the primary flux composition are set forth below.

| | |
|---|---|
| $F_2$ (Mol %) | 0–8 |
| Total Alkaline Earth Oxides (Mol %) | 0–10 |
| $Al_2O_3$ (Mol %) | 0–5 |
| $Fe_2O_3$ (Mol %) | 0–4 |
| $P_2O_5$ (Mol %) | 0–5 |
| $MnO_2$ (Mol %) | 0–3 |
| $ZrO_2$ (Mol %) | 0–4 |
| $MoO_3$ (Mol %) | 0–2 |
| $SnO_2$ (Mol %) | 0–2 |
| $TiO_2$ (Mol %) | 0–4 |
| $La_2O_3$ (Mol %) | 0–2 |
| $Co_3O_4$ (Mol %) | 0–5 |
| NiO (Mol %) | 0–5 |
| $TiO_2$ (Mol %) | 0–5 |

While any one or more of the additives listed above may be used to form the primary flux, it is preferred that the sum of the respective mol % of the alkali oxides, zinc oxide, boron oxide, silica, phosphorous pentoxide and fluorine be no less than 85 mol %.

The primary flux can constitute up to all of the flux composition. However, it is preferred that a secondary flux be used in an amount of no more than 50% by weight based on the weight of the flux composition, most preferably in the range of from about 20 to 50% by weight.

A preferably primary flux has the following composition:

| Component | Amount (mol %) |
|---|---|
| $Na_2O$ | 7.56–12.14 |
| $K_2O$ | 1.18–2.37 |
| CaO | 3.45–5.49 |
| MgO | 0.95–2.57 |
| SrO | 0.47–1.44 |
| ZnO | 28.12–38.46 |
| $Al_2O_3$ | 0.61–1.90 |
| $B_2O_3$ | 27.41–36.45 |
| $P_2O_5$ | 0.85–2.20 |
| $SiO_2$ | 8.51–15.61 |
| $F_2$ | 2.60–4.33 |

A preferred secondary flux has the following composition:

| Component | Amount (mol %) |
|---|---|
| $Na_2O$ | 7.73–13.97 |
| $K_2O$ | 1.40–4.76 |
| CaO | 2.80–5.71 |
| MgO | 0.47–2.54 |
| SrO | 0.47–2.54 |
| ZnO | 24.39–37.77 |
| $Al_2O_3$ | 0.47–5.16 |
| $B_2O_3$ | 22.51–34.92 |
| $P_2O_5$ | 1.17–3.49 |
| $SiO_2$ | 7.27–12.70 |
| $F_2$ | 2.58–7.94 |
| $LiO_2$ | 2.34–5.08 |
| BaO | 0.23–0.76 |

In a preferred form of the invention, the paint composition comprises (a) a major portion of a flux composition comprising from about 50 to 80% by weight, preferably about 75% by weight of a first flux having the following composition:

| Component | Amount (mol %) |
|---|---|
| $Na_2O$ | 7.56–12.14 |
| $K_2O$ | 1.18–2.37 |
| CaO | 3.45–5.49 |
| MgO | 0.95–2.57 |
| SrO | 0.47–1.44 |
| ZnO | 28.12–38.46 |
| $Al_2O_3$ | 0.61–1.90 |
| $B_2O_3$ | 27.41–36.45 |
| $P_2O_5$ | 0.85–2.20 |
| $SiO_2$ | 8.51–15.61 |
| $F_2$ | 2.60–4.33 | and from about 20 to 50% by weight, preferably about 25% by weight of a second flux having the following composition:

| Component | Amount (mol %) |
|---|---|
| $Na_2O$ | 7.73–13.97 |
| $K_2O$ | 1.40–4.76 |
| CaO | 2.80–5.71 |
| MgO | 0.47–2.54 |
| SrO | 0.47–2.54 |
| ZnO | 24.39–37.77 |
| $Al_2O_3$ | 0.47–5.16 |
| $B_2O_3$ | 22.51–34.92 |
| $P_2O_5$ | 1.17–3.49 |
| $SiO_2$ | 7.27–12.70 |
| $F_2$ | 2.58–7.94 |
| $LiO_2$ | 2.34–5.08 |
| BaO | 0.23–0.76 |

(b) a minor portion of at least one pigment; and (c) a minor portion of a compatible liquid medium;

The secondary flux, while meeting the requirement of the mol and ratios thereof for the primary flux, differs from the primary flux in two principal ways. The secondary flux generally has a greater amount of alkali oxide than the primary flux and may include lithium oxide as one of the alkali oxide components. In addition, the secondary flux has a greater amount of fluorine than does the primary flux.

As described previously, lead oxide containing glasses ordinarily have wide firing "windows" i.e. the viscosity dependence of the glass relative to temperature tends to be stable. It has been observed that the viscosity of the glasses described in this invention are more sensitive to temperature variation. The use of two or more lead-free fluxes having slightly different melting temperature ranges has proven to be very effective at providing a lead-free coating that has a wide firing range.

The paint composition of the present invention further contains at least one pigment, a compatible liquid medium and optionally a metal powder.

The pigments employed in the present invention may of any color, although black or gray pigmented oxides are customarily used in the automotive industry for windshields. Examples include cobalt iron chrome black pigment, cobalt chrome alumina pigment and the like. The pigments are employed in an amount of from about 15 to 20% by weight based on the total weight of the flux composition.

The liquid medium employed to produce the paint composition is selected depending on the purpose to which the paint composition is to be used. The liquid medium can be selected depending on whether the paint composition is to be UV-curable, water miscible, thermoplastic and the like. For example, the liquid medium may comprise oil and resins of the type described, for example, in R. Andrews et al., U.S. Pat. No. 4,975,301, incorporated herein by reference.

The present paint composition may optionally include at least one metal powder. The preferred metal powders are aluminum, zinc and magnesium. Aluminum is the most preferred metal powder. The amount of the metal powder employed is typically in the range of from about 1 to 7% by weight based on the total weight of the paint composition, most preferably from about 1.5 to 3.0 % by weight.

The presence of the metal powder, particularly aluminum improves the scratch resistance of the coated windshield. In addition, the metal powder shows excellent silver bleed-through prevention. Often it is advantageous for the windshield manufacturer to print a conductive silver paint over top of the black paint. The silver paint may be used as a defroster grid or radio antennae depending on the composition. It has been observed that the use of from about 1 to 7% by weight based on the total weight of the paint composition, of finely divided aluminum metal, zinc metal or magnesium metal or a mixture thereof, prevents the staining effect or discoloration normally observed when over printing with silver. The exact role that the metals play in preventing this discoloration is not currently understood. Furthermore, the presence of metal powder reduces the tendency of the windshield to stick to the mold during the windshield forming process. It has also been observed that minor additions of these three metals individually or as a mixture help prevent sticking to refractory molds that can be used during the forming process.

EXAMPLE 1

183 g (61 wt %) of a flux composition containing the components:

| Component | Amount (mol %)* |
| --- | --- |
| $Na_2O$ | 8.18 |
| $K_2O$ | 2.02 |
| CaO | 4.06 |
| MgO | 2.57 |
| SrO | 0.77 |
| ZnO | 33.80 |
| $Al_2O_3$ | 0.87 |
| $B_2O_3$ | 32.60 |
| $SiO_2$ | 9.57 |
| $P_2O_5$ | 1.90 |
| $F_2$ | 3.65 |

*mol % rounded off to nearest 0.01 was combined with 44.3 g of cobalt iron chrome black pigment (BK made by The O. Hommel Company) and 5.8 g of cobalt chrome alumina pigment (BG-210 made by The O. Hommel Company).

The pigment containing composition was added to 66.9 g of organic medium containing butyl carbitol (L-278A made by The O. Hommel Company) to form the final paint composition.

EXAMPLE 2

91.5 g of the flux used in Example 1 was combined with an equal amount of a flux having the composition shown below:

| Component | Amount (mol %)* |
| --- | --- |
| $Na_2O$ | 10.84 |
| $K_2O$ | 1.79 |
| $LiO_2$ | 2.74 |
| CaO | 3.63 |
| MgO | 2.26 |
| BaO | 0.58 |
| SrO | 0.68 |
| ZnO | 30.05 |
| $Al_2O_3$ | 0.79 |
| $B_2O_3$ | 28.74 |
| $SiO_2$ | 9.63 |
| $P_2O_5$ | 1.68 |
| $F_2$ | 6.53 |

*mole % rounded off to the nearest 0.01

The flux composition was combined with the same amount of pigment and organic medium as described in Example 1.

EXAMPLE 3

137.25 g of the flux used in Example 1 and 45.75 g of the second flux used in Example 2 were combined with the same amount of each the pigments and the butyl carbitol organic medium employed in Example 1 to form a paint composition.

EXAMPLE 4

82.30 g of each of the flux used in Example 1 and the second flux used in Example 2 were combined with 48.02 g of an iron chromium Nickel manganese pigment (No. 242 made by Shepherd) and 15.90 g of the cobalt chrome alumina pigment (BG-210 made by the O. Hommel Company) employed in Example 1.

4.59 g of aluminum powder was added to the mixture and the mixture was formed into a paint by adding 66.9 g of the organic medium referred to in Example 1.

EXAMPLE 5

The same paint composition as described in Example 4 was prepared except that the amount of the primary flux was 123.47 g and the amount of the secondary flux was 41.12 g.

The paint compositions of Examples 1–5 were weighed, mixed and triple roll milled per methods well known by those skilled in the art. As required, the paint compositions were adjusted to proper printing viscosity with the addition of small amounts of medium that were mixed in. The paints were then screen printed on to windshield glass to produce a uniform coating. The coated glass was then cured (dried) and fired to the appropriate thermal cycle thus producing a permanent coating having excellent properties for use in the automotive industry. Printing viscosities are tailored to the process i.e. depending on screen choice, squeegee pressure, print speed, art work detail, and the like.

The flux powders are produced via conventional means, i.e. after smelting to produce a uniform glass and quenching the glass via traditional methods the glass is then ground to a fine particle size. This grinding process produces a powder that passes through a 325 mesh screen (44 um). Particle size has been optimized between 10 and 30 um for the 90% finer than value as determined by using a Horiba LA-900 laser diffraction particle size analyzer.

Each of the paint compositions prepared in accordance with Examples 1–5 were tested in a conventional manner and found to possess each of the essential properties identified with lead containing compositions including firing at low temperatures, a firing window of at least 100° F., a C.T.E. of less than $92 \times 10^{-7}$, adequate chemical durability, very good scratch resistance, and suitable for overprinting with conductive silver pastes.

We claim:

1. A paint composition comprising:
   a) as a major portion of the paint composition, a flux composition comprising from about 50 to 100% by weight of a flux composition, said first by weight of the flux composition, said first flux containing no lead or lithium and from about 5 to 15 mol % of $SiO_2$, from about 8 to 18 mol % of alkali oxide, and an amount of zinc oxide and boron oxide such that the ratio of the mol % ZnO/mol % $B_2O_3$ is from about 0.8 to 1.3, the ratio of the mol % of $B_2O_3$/mol % $SiO_2$ is from about 2.5 to 5.4 and the ratio of the mol % of alkali oxide/mol % of $SiO_2$ is from about 0.8 to 1.7, and a secondary flux in an amount from about 0 to 50% by weight, said secondary flux composition having a greater amount of alkali oxide and fluorine than the primary flux;
   b) a minor portion of at least one pigment; and
   c) a minor portion of a compatible liquid medium.

2. The paint composition of claim 1 wherein the amount of the first flux is from about 50 to 80% by weight of the flux composition and the amount of the second flux is from about 20 to 50% by weight of the flux composition.

3. The paint composition of claim 2 wherein the amount of the first flux is about 75% by weight of the flux composition and the amount of the second flux is about 25% by weight.

4. The paint composition of claim 1 wherein the secondary flux has a greater amount of alkali oxide than the first flux.

5. The paint composition of claim 1 wherein the secondary flux has a greater amount of fluorine than the first flux.

6. The paint composition of claim 4 wherein the secondary flux contains lithium oxide.

7. The paint composition of claim 1 further comprising a minor portion of a metal powder.

8. The paint composition of claim 7 wherein the metal powder is selected from the group consisting of aluminum, zinc and magnesium or a mixture thereof.

9. The paint composition of claim 8 wherein the metal powder is aluminum powder.

10. The paint composition of claim 7 wherein the amount of the metal powder is from about 1 to 7% by weight based on the weight of the flux composition.

11. The paint composition of claim 1 wherein the flux composition is present in an amount of from about 60 to 80% by weight based on the total weight of the paint composition.

12. The paint composition of claim 1 wherein the liquid medium is present in an amount of from about 20 to 30% by weight based on the total weight of the paint composition.

13. The paint composition of claim 1 wherein the first flux has the following composition:

| Component | Amount (mol %) |
| --- | --- |
| $Na_2O$ | 7.56–12.14 |
| $K_2O$ | 1.18–2.37 |
| CaO | 3.45–5.49 |
| MgO | 0.95–2.57 |
| SrO | 0.47–1.44 |
| ZnO | 28.12–38.46 |
| $Al_2O_3$ | 0.61–1.90 |
| $B_2O_3$ | 27.41–36.45 |
| $P_2O_5$ | 0.85–2.20 |
| $SiO_2$ | 8.51–15.61 |
| $F_2$ | 2.60–4.33. |

14. The paint composition of claim 1 wherein the secondary flux has the following composition:

| Component | Amount (mol %) |
| --- | --- |
| $Na_2O$ | 7.73–13.97 |
| $K_2O$ | 1.40–4.76 |
| CaO | 2.80–5.71 |
| MgO | 0.47–2.54 |
| SrO | 0.47–2.54 |
| ZnO | 24.39–37.77 |
| $Al_2O_3$ | 0.47–5.16 |
| $B_2O_3$ | 22.51–34.92 |
| $P_2O_5$ | 1.17–3.49 |
| $SiO_2$ | 7.27–12.70 |
| $F_2$ | 2.58–7.94 |
| $LiO_2$ | 2.34–5.08 |
| BaO | 0.23–0.76. |

15. A paint composition comprising:
   (a) a major portion of a flux composition comprising from about 50 to 80% by weight of a first flux having the following composition:

| Component | Amount (mol %) |
| --- | --- |
| $Na_2O$ | 7.56–12.14 |
| $K_2O$ | 1.18–2.37 |
| CaO | 3.45–5.49 |
| MgO | 0.95–2.57 |
| SrO | 0.47–1.44 |
| ZnO | 28.12–38.46 |
| $Al_2O_3$ | 0.61–1.90 |
| $B_2O_3$ | 27.41–36.45 |
| $P_2O_5$ | 0.85–2.20 |
| $SiO_2$ | 8.51–15.61 |
| $F_2$ | 2.60–4.33 | and from about 20 to 50% by weight of a second flux having the following composition:

| Component | Amount (mol %) |
| --- | --- |
| $Na_2O$ | 7.73–13.97 |
| $K_2O$ | 1.40–4.76 |
| CaO | 2.80–5.71 |
| MgO | 0.47–2.54 |
| SrO | 0.47–2.54 |
| ZnO | 24.39–37.77 |
| $Al_2O_3$ | 0.47–5.16 |
| $B_2O_3$ | 22.51–34.92 |
| $P_2O_5$ | 1.17–3.49 |
| $SiO_2$ | 7.27–12.70 |
| $F_2$ | 2.58–7.94 |
| $LiO_2$ | 2.34–5.08 |
| BaO | 0.23–0.76 |

(b) a minor portion of at least one pigment; and
   (c) a minor portion of a compatible liquid medium.

16. The paint composition of claim 15 wherein the amount of the first flux is about 75% by weight of the flux composition and the amount of the second flux is about 25% by weight.

* * * * *

UNITED STATES PATENT AND TRADEMARK OFFICE
CERTIFICATE OF CORRECTION

PATENT NO. : 5,504,045
DATED : April 2, 1996
INVENTOR(S) : H. Emlemdi et al.

It is certified that error appears in the above-indentified patent and that said Letters Patent is hereby corrected as shown below:

Column 2, line 66 cancel "tool" insert --mol-- both occurrences

Column 3, line 8 cancel "tool" insert --mol--

Column 3, line 35 cancel "preferably" insert --preferred--

Column 4, line 38 after "mol" insert --%--

Column 5, line 48 after "BK" insert --704--

Column 6, line 28 cancel "Nickel" insert --nickel--

Column 7, line 5 cancel "a" insert --the--

Column 7, line 5 cancel "said first by weight of the"

Column 7, line 6 cancel "flux composition,"

Signed and Sealed this

Twenty-third Day of July, 1996

Attest:

BRUCE LEHMAN

*Attesting Officer*     *Commissioner of Patents and Trademarks*